United States Patent Office 3,027,728
Patented Apr. 3, 1962

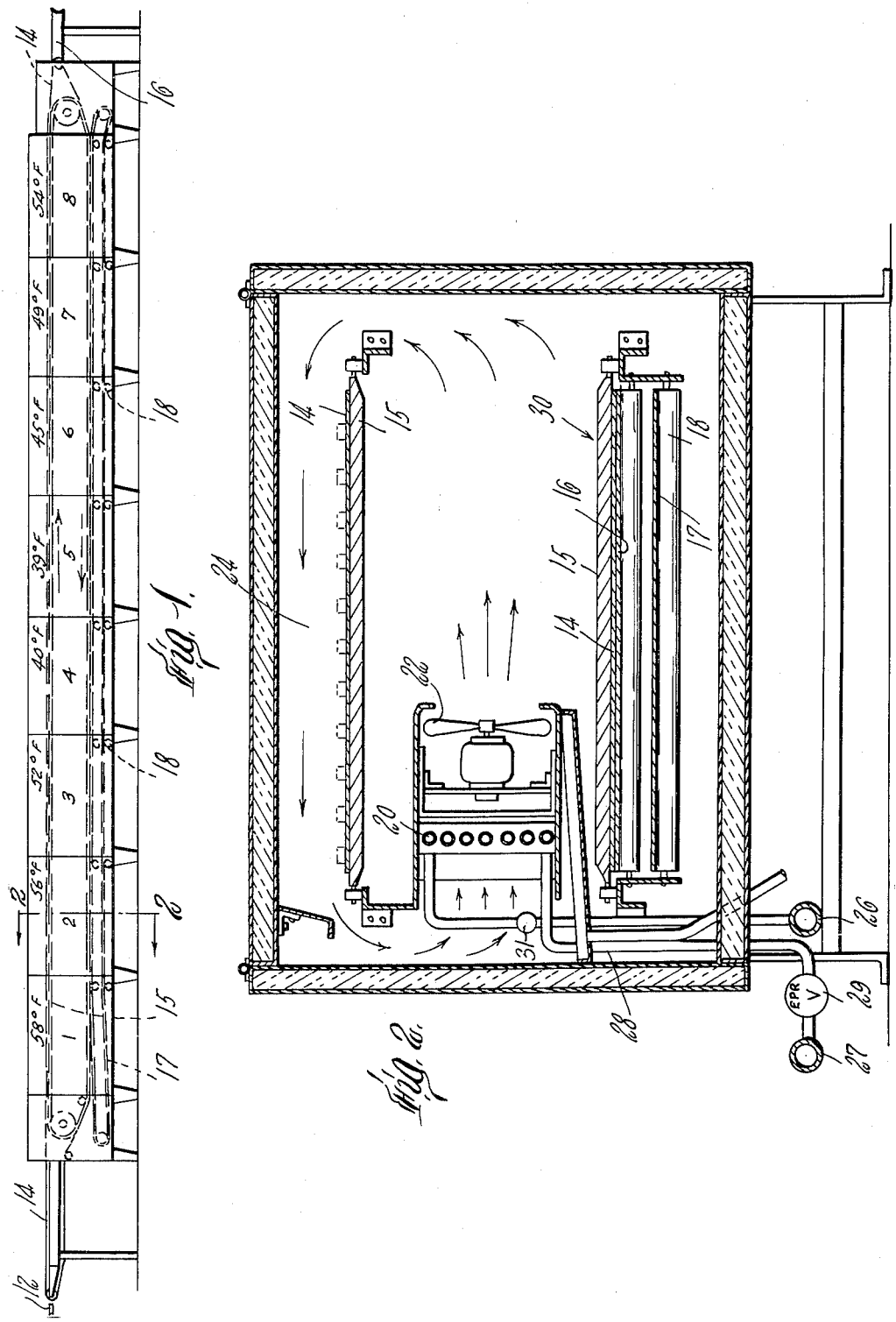

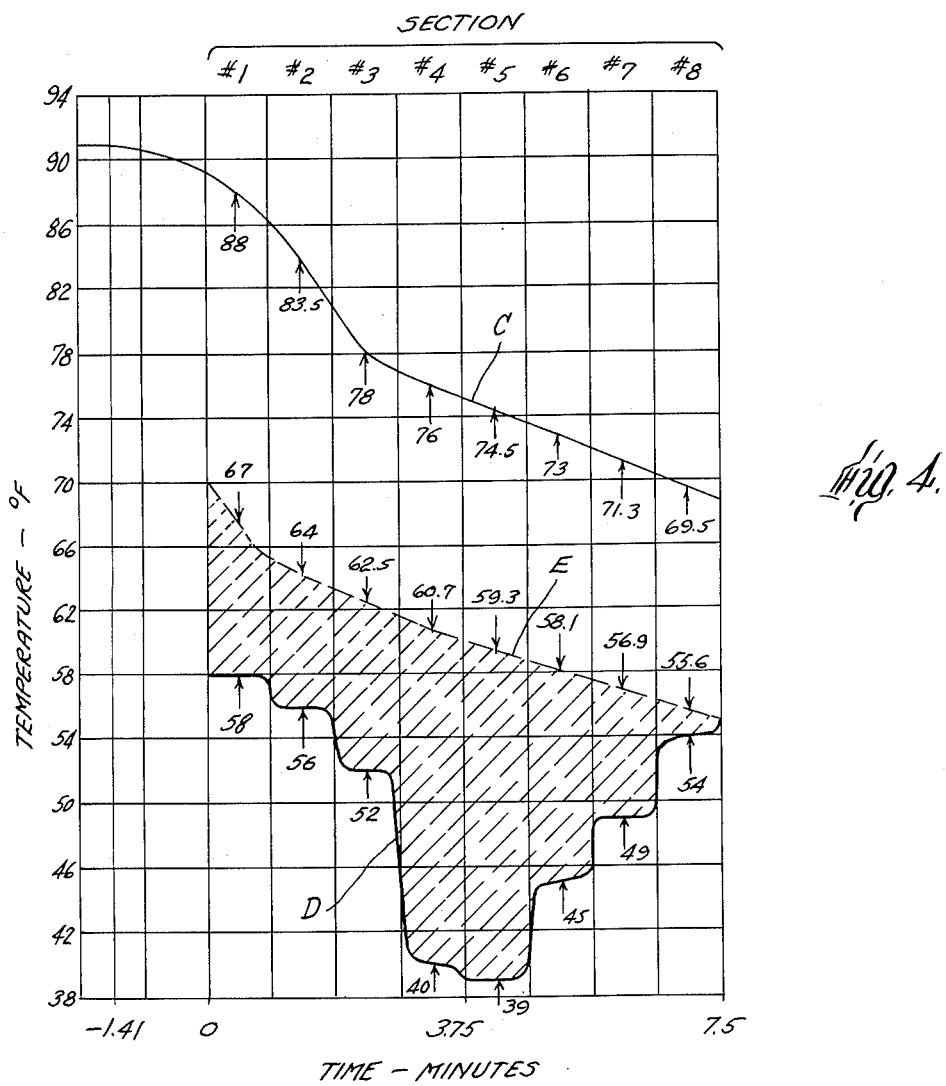

3,027,728
CHOCOLATE CONFECTION COOLING
Fred W. Greer, Lincoln, and Donald H. Lounsbury, Reading, Mass., assignors to J. W. Greer Company, Wilmington, Mass., a corporation of Massachusetts
Filed Nov. 12, 1959, Ser. No. 852,448
5 Claims. (Cl. 62—63)

This invention relates to the manufacture of chocolate confections and more particularly to that phase of confectionery manufacture which involves the cooling of molten chocolate after molding or enrobing operations.

It is well recognized that the behavior of the crystallizable components of chocolate during conversion from a liquid to a solid state has been a source of constant concern to manufactuers of quality confections. If proper attention is not given to the cooling environment, improper crystallization occurs with the result that both the texture and stability of the chocolate is adversely affected. Such imperfection is most noticeable in the tendency of improperly cooled chocolate, even when properly tempered, to develop "fat bloom" concomitant to slow changes in the state of crystallinity progressing over long periods of time, amounting in some cases to many months.

One of the most naive errors in chocolate handling is that of attempting to cool molten chocolate too rapidly. Yet, the universal desire in any kind of production to reduce production time and costs as well as to minimize the space-occupying extent of and investment in lengthy cooling tunnels, has made the confectionary machine manufacturer the target of continual demands for quicker processing equipment.

It is further well recognized that the cooling cycle for chocolate can be so much shortened by proper tempering as to justify substantial investment in chocolate tempering equipment and careful tempering preparation to reduce the duration of the cooling cycle. Nevertheless, even in properly tempered chocolate, the release of heat of crystallization has made the cooling cycle a weak link in the chain of high speed automatic chocolate confection manufacture. The confectionary manufacturer still relies upon long cooling tunnels through which the chocolate may be slowly advanced to very gradually reduce its temperature to a point where it can be handled, i.e., packed without marring, or below, and involving periods of sometimes as much as thirty minutes or longer.

The most common commercial tunnels operate with a countercurrent of cooling air flowing from the confection conveyor exit to the conveyor entrance into the tunnel. One then fixes the air input temperature at the conveyor exit to insure that the chocolates will at that point be low enough in temperature to permit handling for packaging without marring the chocolate, but still high enough in temperature to be above the dew point temperature in the packing room to prevent condensation of moisture thereon with resultant "sugar bloom." Having arrived at such a proper exit temperature, taking into account the length of the tunnel and the amount and speed of material being conveyed through the tunnel, the temperature of the air at the conveyor input end is then wholly dependent upon the volume of air progressing in countercurrent flow through the tunnel and is generally found, with other factors constant, to be at a value reflecting a substantially linear air temperature decreasing gradient from conveyor entrance to exit with the result that the subsurface temperature of the chocolate as it proceeds through the tunnel follows substantially the same gradient with only small variation in the differential between the subsurface chocolate temperature and the temperature of the air throughout the entire length of the tunnel.

The present invention is predicated upon the discovery that the rate of cooling of a particular properly tempered chocolate, so far as control of the crystallization and hence resulting physical characteristics of the cooled chocolate is concerned, is critically only during that portion of the temperature-time cooling curve which precedes the inflection or major inflection in that curve caused by heat of crystallization; and that, thereafter, much more rapid heat extraction than that heretofore thought possible can be accomplished wihout loss of the desired physical characteristics. Fortunately, such inflection point is a measurable quantity for any given type of chocolate in any given condition of temper. As a result, once this time point in the temperature-time cooling curve is known for a line of particular chocolate pieces to be processed, the second phase of the cooling can be accomplished at as great a rate as is consistent with economical operation so long as a properly slow rate of cooling is maintained during the first phase of cooling.

A primary object of this invention is therefore to provide a method and means for obtaining a vastly increased rate of heat transfer from solidifying chocolate following an initial period of more nearly conventional rate of heat transfer, based upon a knowledge of the time required for a given chocolate at a given slow rate of heat transfer to carry its crystallization before the initiation of the more rapid heat transfer, far enough to insure proper physical characteristics in the final product.

As can readily be seen, typical countercurrent flow equipment with its substantially linear gradient of temperature of the cooling air cannot achieve these results.

One form of equipment which can be utilized to accomplish the purposes of this invention is shown in the accompanying drawings wherein:

FIG. 1 is a diagrammatic elevational view of a sectionalized cooling tunnel operating in accordance with this invention, omitting refrigerant piping for the purposes of clarity;

FIG. 2 is a cross-sectional view taken along the line 2—2 of FIG. 1 through one of the sections shown in FIG. 1;

Figure 3:
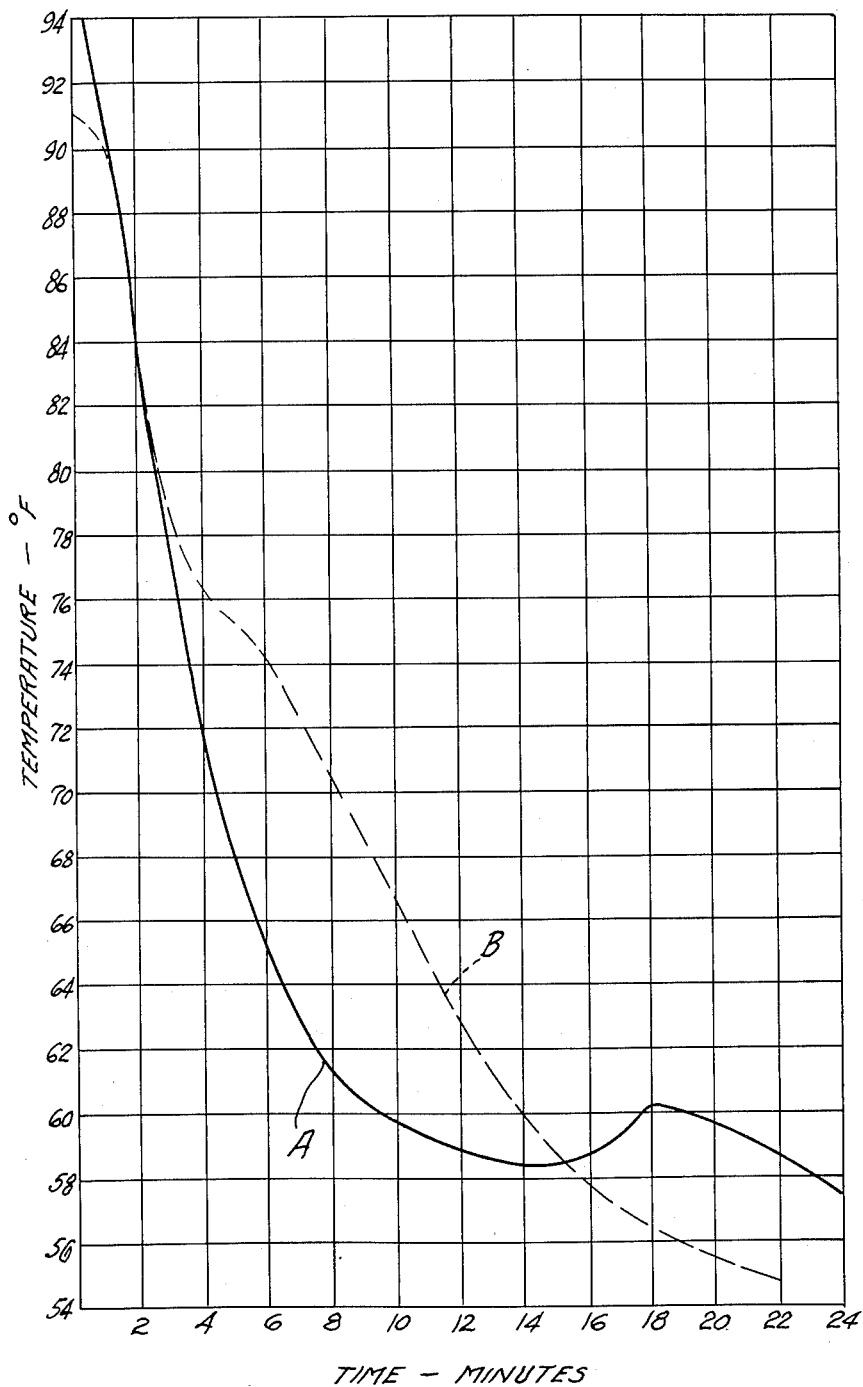

FIG. 3 is a graph showing a typical time-temperature curve of a conventional untempered chocolate and of the same chocolate after proper tempering, as determined by a thermistor while the chocolate is solidified by a 50° F. constant-temperature water bath; and FIG. 4 is a graph showing the differential between subsurface chocolate temperature and the temperature of the applied cooling medium throughout the sections of the apparatus shown in FIG. 1 and showing in dash lines the comparative differential temperature that would occur between the subsurface chocolate temperature and the air temperature were countercurrent flow air utilized in accordance with the prior art.

FIG. 1 shows an apparatus which is intended to be used in conjunction with a conventional chocolate coater or enrober. Such coaters normally have an exit curtain or curtains of chocolate and the enrobed chocolates advance beyond said curtain on a moving conveyor belt 12. As the chocolates advance on this belt 12, they are fed onto a product conveyor belt 14 which carries them, supported by a sectionalized endless metal tray conveyor 15 through the horizontal cooling tunnel to the exit where they emerge onto a packing table shown at 16.

FIG. 1 also shows a scrap conveyor 17 which helps to support the elements of conveyors 14 and 15 as they return along their lower traverse. In turn rollers 18 in each section support scrap conveyor 17 on its forward and return traverse.

The cooling tunnel, as shown in the drawing, consists essentially of eight identical sectionalized open-ended compartments each of which is provided with an individual path for the application of the cooling medium in the form of air in each section.

As shown in FIG. 2 each compartment is provided below the conveyor but above the return traverse 30 with a refrigerating coil unit 20 and one or more fans 22 which propel air around one side of the conveyor through the zone 24 over the conveyor and then around underneath the top traverse of the conveyor in continuous endless path circulation with recooling in each circuit from the refrigerating coil.

While all the coils may be connected through feed header 26, expansion valves 31 and return header 27 to a single source of refrigerant, the coil in each section is provided in the return line 28 to return header 27 with an evaporator pressure regulator 29 for controlling the temperature of the coil in each compartment to produce a predetermined selected air temperature. It is therefore possible by manipulating the regulator 29 for each section to adjust the temperature in each section independent of the temperature in every other section and therefore to vary the gradient air temperature throughout the conveyor in any manner desired limited only by the capacity of the refrigerant compressor and consistent with maximum permissible coil frosting for a given system.

Because each section freely communicates with its adjacent sections or the ends of the tunnel in order to permit continuous free passage of the candies through the tunnel, the temperature in each compartment is somewhat influenced by the temperature in the adjacent compartments and the ends of the tunnel with the result that a temperature gradient curve results throughout the whole length of the conveyor.

FIG. 1 shows in each section a designed air temperature in zone 24 for that section for a typical run on a chocolate hereinafter described. (These figures were taken longitudinally medially of each section.) Transposed into a graph this results in a U-shaped temperature gradient curve D shown in FIG. 4 with temperatures ranging between about 58° F. and 39° F.

In the particular operation as shown in FIG. 4, the conveyor is operated at such a speed that it takes 7½ minutes from the time a chocolate enters the first compartment until it emerges from the last compartment.

The curve C in FIG. 4 shows the subsurface temperature of the chocolate as it proceeds from the coater exit curtain through the last No. 8 section (taken medially of each section). As there shown, the subsurface chocolate was cooled in this period from a temperature of about 91° F. to an emerging temperature of about 68.5° F. It entered section 1 at a temperature of about 90° F. The air in the first three sections of the tunnel is maintained at 58° F., 56° F., and 52° F. respectively or for a period of about 2.80 minutes. As they proceed into section 4, they encounter an abruptly cooler temperature dropping down to 40° F.; and by the time they arrive at section 6 they have been subjected to an air temperature of about 39° F. in section 5, and the subsurface temperature (curve C) has reached about 74° F. The subsurface temperature at this point may vary between 72° F. and 78° F. depending upon the nature of the product, i.e., thickness of coating, type of center, size and weight of center, specific heat of center, etc.

Sections 6, 7 and 8 are maintained at higher air temperatures than sections 4 and 5 in order that, prior to the emergence from the tunnel, the outside surfaces of the chocolate will not be so low in temperature as to be below the dew point temperature of the packing room. Thus 45° F., 49° F. and 54° F. are typically suitable for sections 6, 7 and 8 respectively. As will be understood, the surface temperature of the chocolate at the exit end will still be substantially below the subsurface temperature and therefore aids in cooling the interior chocolate right up to the time of emergence from tunnel No. 8.

The temperatures as shown in FIG. 1, chosen as illustrated, are based upon an empirical determination of the amount of advance required before the permissible rate of cooling may be increased. This determination is made by measuring by means of a thermistor the subsurface temperature of the chocolate being conveyed through the tunnel under operating conditions and so adjusting the temperatures of the coils in the first few sections as to insure that the inflection point in the temperature-time curve of the piece of chocolate being measured occurs before the piece of chocolate enters any section of the tunnel which sharply increases the rate of heat transfer. While the scale of the chart shown in FIG. 4 is such that the inflection point is not dramatically shown, it can be seen that it occurs somewhere before the three-minute mark is reached and during the travel of the piece of candy through section 3. It is thus permissible to abruptly decrease the temperature in this case at the entrance into section 4. For the purposes of further explaining the inflection point, FIG. 3 shows a larger scale curve B of a typical properly tempered chocolate as determined by a thermistor placed in a molten glob of chocolate contained in an aluminum container cooled in a water bath at constant 50° F. temperature. Under these conditions it will be seen that the inflection occurs somewhere before 5 minutes. This time period is in contrast to the same chocolate when untempered which provides a curve as shown by the curve A with the inflection point occurring only after 14 minutes.

The above-described water bath test is of considerable value in the quality control of confectionery manufacture. Once the proper temperature settings have been determined by actual test of subsurface temperature with a thermistor proceeding through the tunnel, a water bath test may be made on that same chocolate and thereafter a production control may be set up involving periodical sampling of the molten chocolate in the coater by the water bath test, and if the inflection point in the water bath test continues to remain substantially at the same temperature, the manufacturer can be assured that proper cooling of the chocolate will continue with the original tunnel air temperature settings.

Referring back to FIG. 4, for the purposes of comparison there is a broken line curve E which corresponds to the air temperature gradient should a countercurrent flow of air be introduced at the exit end of the cooling tunnel at a temperature of about 55° F. As shown by this curve the air temperature as the air emerges from the front entrance of section 1 reaches a temperature of 70° F. Any attempt to introduce the air at the exit end at a lower temperature than 54° F. (for a dew point of 53° F.) would result in carrying the external chocolate surface temperature so low at the exit as to cause condensation on the chocolate and prevent unmarred handling and/or "sugar blooming" so that the general location of the dash line curve cannot be favorably changed without lowering the dew point packing room temperature into an uncomfortable working range. Accordingly, the applied temperature range is between about 54° F. and 70° F., and is in a gradient of a slope corresponding nearly to the slope of curve C.

The contrast in the two operations is admirably shown in FIG. 4, which illustrates the gain in heat extracted by the utilization of the method of the present invention in equipment of the type described. Such gain is depicted by the hatched area between curves E and D. The time which it would take should a tunnel of the same length be provided with the counterflow cooling medium would be in excess of 160% of the 7½-minute time provided for the operation in accordance with the invention heretofore described. This can be estimated by the simple calculation of multiplying 7.5 minutes × the sum of the differentials between the subsurface chocolate temperature and the temperature of the air medially of each section (which figures are shown in FIG. 4) divided by the sum of such differentials (also shown in FIG. 4) where the counterflow tunnel is used.

Thus tabulating the temperatures and temperature differentials shown in FIG. 4 one arrives at the following:

| Section | Curve C Temp. | Curve E Temp. | Differential Temp. | Curve D Temp. | Differential Temp. |
|---|---|---|---|---|---|
| 1 | 88 | 67 | 21 | 58 | 30 |
| 2 | 83.5 | 64 | 19.5 | 56 | 27.5 |
| 3 | 78 | 62.5 | 16.5 | 52 | 26 |
| 4 | 76 | 60.7 | 15.3 | 40 | 36 |
| 5 | 74.5 | 59.3 | 15.2 | 39 | 35.5 |
| 6 | 73 | 58.1 | 14.9 | 45 | 28 |
| 7 | 71.3 | 56.9 | 14.4 | 49 | 22.3 |
| 8 | 69.5 | 55.6 | 13.9 | 54 | 15.5 |
|  |  |  | 130.7 |  | 220.8 |

$\frac{220.8}{130.7} \times 7.5$ minutes = 12.6 minutes.  $12.6 \div 7.5 = 1.68$ or 68% increase in time necessary in the case of the counterflow current to secure the same amount of heat transfer.

The above tabulation similarly demonstrates that in the case of operation in accordance with this invention, in the exemplary case, the temperature differentials fluctuate between 15.5 and 36° F. or over a range of 20.5° F., whereas in the prior art the temperature differential would vary only by 7.1° F. (21°—13.9°) and with a substantially constant slope.

The result is that in accordance with the invention the temperature differential starts low (30° F. in section 1) and is subsequently increased to a value (36° F. in section 4) in excess of the initial differential, whereas heretofore the initial value (21° F. in the example) was never exceeded throughout the remainder of the tunnel.

The aforesaid figures have been given for purposes of explanation only in connection with a typical example of practice in accordance with this invention. It will be understood that such figures will vary depending upon the particular product. The important feature of the invention as explained is that the cooling rate as shown by curve D in any case is sharply increased after an initial relatively short period of substantially constant and lower rate of cooling.

What is claimed is:

1. In the cooling of molten chocolate by the application of a heat absorbing medium to surfaces of the hot chocolate, as in confectionery manufacture, the improvement which comprises applying said medium at a temperature of said medium lower than the subsurface temperature of the chocolate but high enough and for a period of time sufficient to induce crystallization of the crystallizable ingredients of the chocolate and beyond the point of inflection in the time-temperature cooling curve of said subsurface chocolate caused by heat of crystallization under the applied conditions and then decreasing the temperature of said applied medium to increase the temperature differential between said applied medium and said subsurface temperature to a value greater than the initial differential between the temperature of said applied medium and said subsurface temperature.

2. The improvement as claimed in claim 1 wherein the temperature differential between said subsurface temperature and the temperature of the applied medium is maintained at said value greater than the initial temperature differential until said subsurface temperature reaches 72–78° F.

3. The improvement as claimed in claim 1 wherein the temperature differential between said subsurface temperature and the temperature of the applied medium is maintained at said value greater than the initial temperature differential until said subsurface temperature reaches 72–78° F. and thereafter increasing the temperature of the said applied medium to raise the surface temperature of the chocolate for preventing condensation of moisture thereon.

4. In the cooling of molten chocolate, as in confectionery manufacture, the improvement which comprises advancing hot coated chocolate pieces in continuous succession along straight paths while subjecting their surfaces to transverse flow across said paths of cooling air at varying temperatures, the differential between the temperature of the subsurface chocolate and of the air in said transverse flow being substantially increased for at least a portion of said advance to a value above the differential temperature at the beginning of the advance of said chocolate pieces through said transverse flow.

5. In the cooling of molten chocolate, as in confectionery manufacture, the improvement which comprises advancing hot coated chocolate pieces in continuous succession along straight paths while subjecting their surfaces to transverse flow across said paths of cooling air at varying temperatures, the differential between the temperature of the subsurface chocolate and of the air in said transverse flow being gradually increased for at least a portion of said advance to a value above the differential temperature at the beginning of the advance of said chocolate pieces through said transverse flow, and thereafter being gradually decreased to raise the surface temperature of the chocolate for preventing condensation of moisture thereon.

References Cited in the file of this patent

UNITED STATES PATENTS

| | | |
|---|---|---|
| 1,753,828 | Greer et al. | Apr. 8, 1930 |
| 1,990,663 | Muffly | Feb. 12, 1935 |
| 2,223,972 | Sterling | Dec. 3, 1940 |
| 2,384,077 | Crosley et al. | Sept. 4, 1945 |
| 2,389,106 | Marshall et al. | Nov. 13, 1945 |
| 2,474,069 | Silvera | June 21, 1949 |
| 2,531,773 | Greer | Nov. 28, 1950 |
| 2,783,618 | Mills | Mar. 5, 1957 |
| 2,784,096 | Ciccone | Mar. 5, 1957 |